(No Model.)
A. SPRINGER & F. A. ROEDER.
BALANCE.
No. 310,471. Patented Jan. 6, 1885.
Fig. 1.
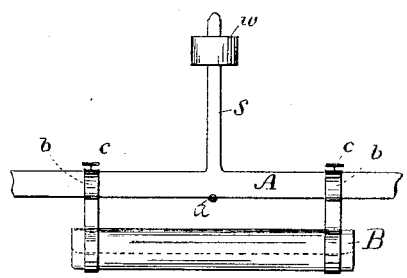
Fig. 2.
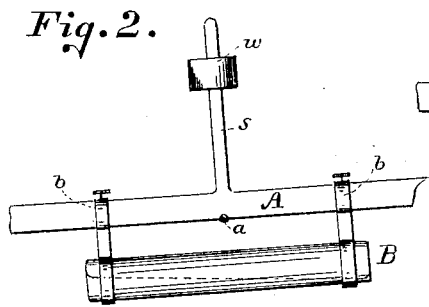
Fig. 6.
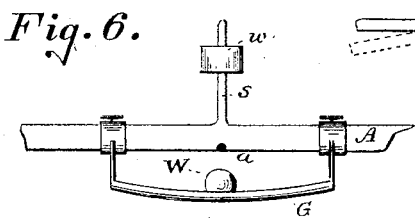
Fig. 3.
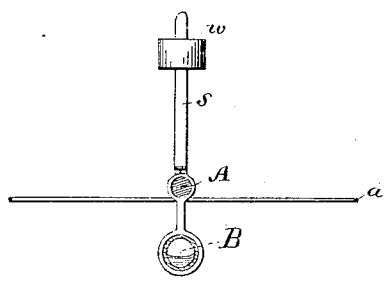
Fig. 4.
Fig. 5.
Fig. 7.
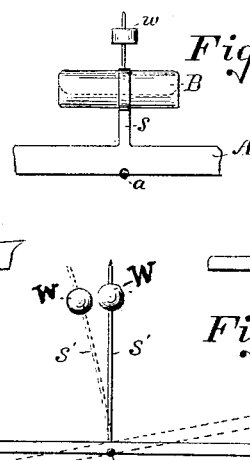
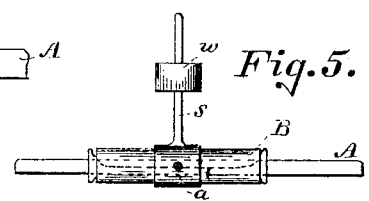
Attest:
R. M. Hosea
C. Shappell
Inventor:
Alfred Springer
Frederick A. Roeder.
By R. M. Hosea, Attorney.

UNITED STATES PATENT OFFICE.

ALFRED SPRINGER AND FREDERICK A. ROEDER, OF CINCINNATI, OHIO.

BALANCE.

SPECIFICATION forming part of Letters Patent No. 310,471, dated January 6, 1885.

Application filed June 2, 1884. (No model.)

*To all whom it may concern:*

Be it known that we, ALFRED SPRINGER and FREDERICK A. ROEDER, citizens of the United States, residing at Cincinnati, Ohio, have invented new and useful Improvements in Balances, of which the following is a specification.

Our invention relates to balances employing supports—such as wires, bands, &c., of metal or other elastic material—for the pivotal bearings of the scale-beam, in which a resistance of torsion or flexion, as the case may be, is opposed to the deflection of the beam; and it consists in the combination, with the beam, of an automatically-shifting weight arranged to oppose a corresponding increase of gravitating force to the increasing resistance of pivotal deflection, securing thereby a sensitive and delicate action of the balance by practically overcoming or neutralizing such molecular resistance of the pivots.

The essential principles of our invention may be carried out in various ways, some of which are illustrated in the accompanying drawings, in which—

Figure 1 is a side elevation of a simple scale-beam at rest, torsionally supported, with a tube attached containing a liquid shifting its relative center of mass and of weight in relation to the center of beam-oscillation as the beam is deflected; Fig. 2, a similar elevation showing the beam deflected; Fig. 3, a cross-section of the beam and attached tube; Fig. 4, an elevation showing the tube mounted above the beam; Fig. 5, an elevation showing the beam hollow and containing the liquid constituting the shifting weight; Fig. 6, an elevation showing as a modification an inclined guideway attached to the beam, with a rolling weight arranged to shift its position by gravity thereon as the beam is deflected; Fig. 7, an elevation of a beam, with a weight mounted upon an elastic standard oscillating by the deflection of the beam.

In balances of this character, where a wire, band, rod, or spring, &c., acting torsionally or flexionally, according to the mechanical mounting of the beam, is utilized as a substitute for the knife-edges and other forms of fulcrum-supports, the deflection of the beam from its normal position of rest is resisted by the molecular elasticity of the pivotal bearing. Could such resistance be exactly neutralized, it is obvious that a perfect balance of the beam would be attained irrespective of its angular deflection, and since the torsional or flexional pivot excludes ordinary friction the sensitiveness of the scale will be attained in proportion to the extent to which this molecular resistance is overcome without being wholly neutralized. This desirable result we attain in a degree hitherto unknown in practice by employing a shifting weight arranged to move toward the descending end of the beam as the same is deflected from its normal position of rest.

We have selected to illustrate the principle of our invention a simple beam (designated by the letter A in the drawings) mounted upon a torsional pivot, (shown in cross-section at $a$,) the other details of the scale—such as the fulcrum-supports, scale-pans, and connections, &c.—being omitted from the drawings, as the same are not involved in our present improvements, to which beam is attached (in the case illustrated in Figs. 1, 2, and 3) a short section of tubing, B, preferably of glass, arranged beneath and parallel to the beam, and held securely by collars and depending yokes $b\ b$. The latter are preferably fitted upon the beam in such manner as to permit adjustment of the tube longitudinally, and may be provided with set-screws $c$, for permanent security to the beam. The tube B may contain mercury or any other suitable liquid whose action is not impeded by excessive capillary or frictional resistance, and, as clearly illustrated in Figs. 1 and 2 by the dotted lines, the fluid is actuated by gravity to flow toward the depressed end of the tube as the beam is deflected, thereby transferring its weight in proportion to the deflection to the depressed side of the beam-center. It will be observed that by this construction the suspending of the weighted tube beneath the beam lowers the center of gravity of the balance to a point below the center of beam-oscillation, so that, as will be obvious, the effective action of the liquid under the influence of gravity is counteracted to some extent by the gravitating action of the containing-tube in the contrary direction, for which and other reasons we find it desirable to retain, in connection with the tube, the vertical standard S, with the poise-weight $w$, so that in the deflection of the beam the counteracting effect of the containing-tube is practically neutralized, besides which the center of gravity of the balance is preserved at a point more nearly coincident with the center of beam-oscillation. Moreover, the poise w being held with sufficient friction to permit adjustability on the standard S, or adjustably retained by a set-screw and acting with the liquid in opposition to the molecular resistance of the pivot a in the deflection of the beam, it may be utilized as a means of securing a more delicate adjustment of the balance when required by thus obtaining a more exact correspondence between the molecular resistance of the pivot and the total effective weight opposed thereto.

As shown in Fig. 4, the tube B is mounted above the beam, secured in a ring formed in the standard S and parallel to the beam. In this case the center of gravity of the balance is wholly above the pivot-axis, and the weight of the containing-tube is added to that of the contained liquid in opposing the torsional resistance of the pivot. Consequently the poise w, when used, may be of less weight than in other cases.

As shown in Fig. 5, the tube is arranged in the axis of the scale-beam, and may be substituted for and used as the beam where the length of the beam thus constructed and consequent loss of time in the gravitating action of the contained liquid are not objectionable. In the construction shown the beam proper is extended axially through the tube B, and the torsional pivots secured to an embracing-ring surrounding the tube centrally.

While we prefer to employ a liquid as the shifting weight, for the purpose explained, and for reasons of convenience and certainty of action, a solid weight may be employed in the manner indicated in Fig. 6, where the weight W, preferably a true sphere, is held upon a slightly-curved guideway, G, suspended below the beam, as shown, or secured above the same by suitable means. In such case the weight will roll from side to side under the influence of gravity as the beam is deflected, and (omitting the question of friction) will produce the same results as the liquid before described. This construction is more desirable in platform and other large scales. The solid weight may also be utilized in the manner shown in Fig. 7 by mounting the same upon an elastic standard, S', normally vertical to the beam, but bending out of its normal relative position, as indicated by the dotted lines in the figure, when the beam is deflected.

It will be obvious, without detailed description, that the action of the shifting weight will be the same where the beam is mounted upon flexional pivots, and the same advantageous results are attained in practice.

We claim as our invention and desire to secure by Letters Patent of the United States—

1. In an elastic pivot-balance, a movable weight arranged to automatically shift its position relatively to the center of beam-oscillation toward the depressed end of the beam as the same is deflected, and oppose thereby a counteracting force to the molecular resistance of the elastic pivot or pivots, substantially as set forth.

2. In an elastic pivot-balance, the combination, with the beam and its elastic pivot, of a shifting weight arranged to move automatically toward the depressed end of the beam as the latter is deflected, and a poise or supplemental weight mounted on a vertical fixed standard oscillating with the beam, substantially as set forth.

3. In an elastic pivot-balance, the combination, with the beam and a pivot acting by molecular displacement and involving molecular resistance thereby, of a tube or vessel containing liquid which by deflection of the beam is carried by gravity toward the depressed end of the beam, thereby opposing a counter-resistance of the gravity of the liquid to the resistance of the pivot, substantially as and for the purpose specified.

In testimony whereof we have hereunto set our hands in the presence of two subscribing witnesses.

ALFRED SPRINGER.
FREDERICK A. ROEDER.

Witnesses:
L. M. HOSEA,
C. SHAPPELL.